United States Patent Office 3,309,376
Patented Mar. 14, 1967

3,309,376
BIS-QUATERNARY AMMONIUM SALTS
Howard C. Haas, Arlington, and Lloyd D. Taylor, Everett,
Mass., assignors to Polaroid Corporation, Cambridge,
Mass., a corporation of Delaware
No Drawing. Filed July 27, 1965, Ser. No. 475,261
4 Claims. (Cl. 260—296)

This is a continuation-in-part of application Serial No. 128,699, filed August 2, 1961, now abandoned.

This invention relates to dyeing and more particularly to dyeing polymeric materials.

One object of this invention is to provide a novel dyeable polymeric material.

Another object of this invention is to provide a novel dyeable polymeric material that is substantially insensitive to water and fast to dyes.

Another object of this invention is to provide novel cross-linking agents for polymers, which cross-linking agents are also dye mordants.

Still another object of this invention is to provide a novel dyeable polymeric material that has been cross-linked by a novel cross-linking mordant.

Other objects of the invention will in part be obvious and will in part appear hereinafter.

The invention accordingly comprises the relation and order of one or more of such steps with respect to each of the others, and the products possessing the features, properties, and the relation of elements which are exemplified in the following detailed disclosure, and the scope of the application of which will be indicated in the claims.

For a fuller understanding of the nature and objects of the invention, reference should be had to the following detailed description.

In the past it has been found desirable to treat dyeable polymeric materials which are permeable to an aqueous dye solution, and particularly an aqueous alkaline dye solution, for example, polyvinyl alcohol, gelatin, and other polymers containing —OH, —NH$_2$ and —SH groups which are capable of reacting with aldehydes, in such a way as to render them insensitive to water. The purpose of rendering said polymeric sheet insensitive to water is to prevent swelling and resulting distortion of the polymeric strata. Such distortion is particularly undesirable if the polymer is on a support or backing stratum. Water insensitivity may be achieved in polyvinyl alcohol, for example, by cross-linking at least the surface of the polymers to form acetal links.

In the past it has also been found desirable to introduce mordant sites, e.g., quaternary nitrogen atoms, into the dyeable polymer to fix the dye in the polymer.

An example of such a mordant may be found in the copending U.S. application of Howard C. Haas, Serial No. 71,424, filed November 25, 1960, now U.S. Patent No. 3,239,337, issued March 8, 1966.

It has now been discovered that a superior dyeable stratum can be obtained by treating a polymer with a novel compound which is a cross-linking agent and which contains at least two mordanting sites.

The dyeable polymeric strata of the present invention may be prepared by coating a support, for example, glass or baryta paper, with a coating solution containing a polymer, particularly vinyl polymers, for example, polyvinyl alcohol, a dialdehyde containing two quaternary nitrogen atoms, and a trace of a mineral acid. After coating, the support is heated for 2 to 40 seconds. The degree of water-insensitivity is controlled by the length of time the sheet is heated.

Segments of polymers containing such cross-linking mordants may be illustrated, for example, by the following formula:

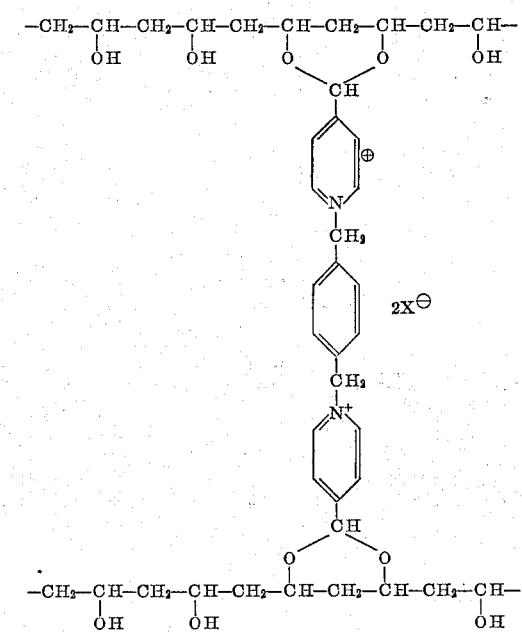

wherein X$^\ominus$ is an acid anion.

Polymers that are prepared in this manner and dyed have been subjected to boiling water without any evidence of solubility of water-sensitivity of the polymer or extraction of the dye.

In addition to preparing new dyeable polymeric materials, the cross-linking mordants of this invention may also be used to modify other dyeable polymeric materials, for example, the image-receiving sheet of the above-identified copending application of Howard C. Haas, Serial No. 71,424, to cross-link the polymer, thereby reducing water-sensitivity and also to provide additional mordant sites. Segments of such polymers treated with the cross-linking mordants of this invention may be illustrated, for example, by the following formula:

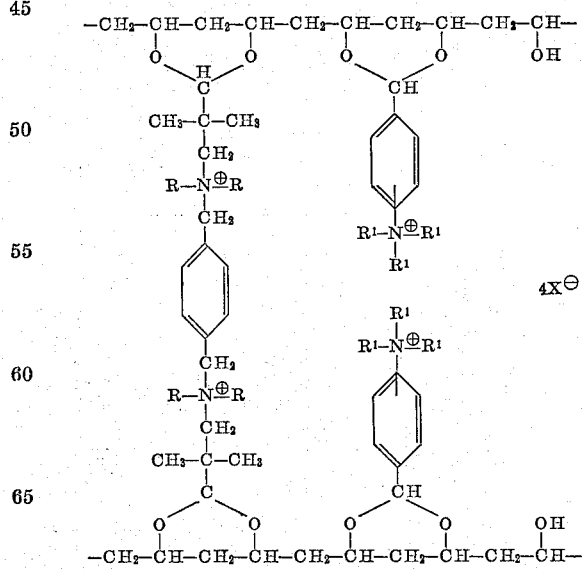

wherein X$^\ominus$ has the same meaning as above and each R and R[1] is an alkyl group; said R[1]'s together comprising not more than 8 carbon atoms.

The cross-linking mordants of this invention may be prepared by reacting a tertiary aminoaldehyde with a multi-functional alkylating agent.

As examples of suitable tertiary aminoaldehydes mention may be made of 3-dimethylaminopivaldehyde, p-dimethylaminobenzaldehyde, 4-pyridine carboxaldehyde, 3-pyridine carboxaldehyde, 4 - dimethylaminocinnamaldehyde.

As examples of suitable multi-functional alkylating agents mention may be made of α,α'-dibromo-p-xylene, α,α' - dibromo-m-xylene, α,α' - dichloro-p-xylene, 1,3 - dibromopropane, 3-bromopropyl-p-toluenesulfonate, propylene glycol-1,3-bis-benzenesulfonate, 1,4-dibromobutane and 1,4-dibromobutene-2.

The anionic portion of the quaternary salt appears to have little or no effect on the ability of the compounds of this invention to function as mordants and therefore may be selected from the various anions.

As examples of quaternary salts that are useful in this invention, mention may be made of the following:

(1)
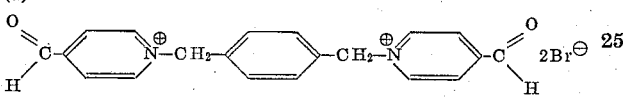

(2)
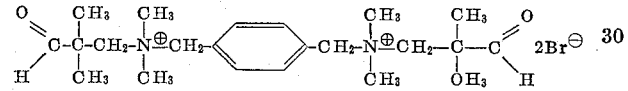

(3)
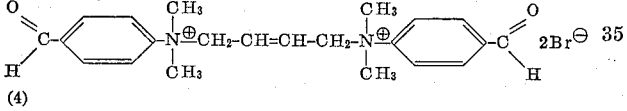

(4)
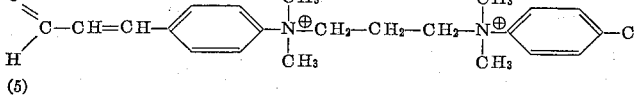

(5)
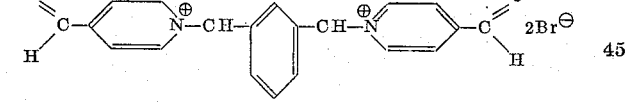

The novel cross-linking mordants of this invention may also be prepared by reacting a haloaldehyde such as p-formylbenzylchloride (p-chloromethylbenzaldehyde) and a di-tertiary amine. As examples of diamines suitable for use in the preparation of compounds of this invention, mention may be made of bis-1,3-dimethylaminopropane, N,N,N',N'-tetramethyl-p-phenylenediamine, bis-1,4 - dimethylaminobutane and 1,4-diazobicyclo-(2,2,2)-octane.

The term "dialdehyde," as used herein, should be understood to include derivatives of dialdehydes which are also useful in supplying the cross-linking function of the novel cross-linking mordants of this invention. Such aldehyde derivatives include acetals, gem-diesters and gem-diols. The preparation of such derivatives is analogous to the preparation of the dialdehydes and known to the art. For example, diacetal cross-linking mordants within this invention may be prepared by reacting a ditertiary amine with a haloacetal or by reacting a dihalide and a tertiary amino-acetal. In the preferred embodiment, however, the quaternary salt contains terminal aldehyde groups.

It should be understood that some aldehydes are hydrated in aqueous solution and exist as mixtures of aldehydes and gem-diols or entirely as gem-diols. This is especially true when an electron withdrawing quaternary nitrogen atom is in close proximity to the aldehyde group. As stated above, the gem-diol form of the compound is also a cross-linking agent.

As an example of a diacetal cross-linking mordant within the scope of this invention, mention may be made of the following:

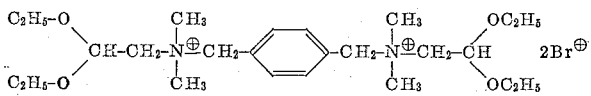

While the preferred cross-linking mordant of this invention comprises a dialdehyde containing at least two quaternary nitrogen atoms, it should be understood that the cross-linking mordants of this invention may be any compound that contains functional groups, e.g., isocyanates, that can react with the —OH, —NH$_2$, or —SH groups of the polymer to thereby cross-link the polymer, and contains at least two functional groups capable of mordanting dyes, e.g., intralinear quaternary nitrogen atoms.

By way of recapitulation, the cross-linking mordants of this invention are bi-functional compounds containing at least two intralinear quaternary nitrogen atoms the functional groups being capable of reacting with the —OH, NH$_2$, or —SH groups of a polymer.

The preferred cross-linking mordants may be represented by the formula:

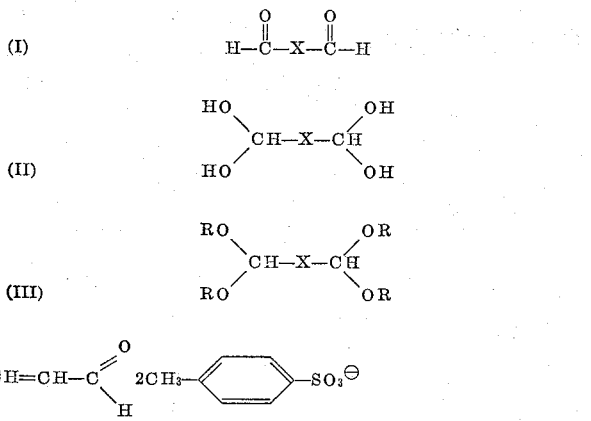

wherein X is a divalent organic radical containing carbon, hydrogen, and two intralinear quaternary nitrogen atoms, and each R is a lower alkyl group.

The following non-limiting examples illustrate the preparation of cross-linking mordants for use in this invention.

EXAMPLE I

A mixture of α,α'-dibromo-p-xylene and an excess of 3-dimethylaminopivaldehyde in dry benzene was heated to 80° C. on a steam bath for 2 hours. The resulting viscous green precipitate is separated and dissolved in absolute alcohol and reprecipitated in ether. The resulting white, hygroscopic salt, p-xylylene-bis-3-dimethylammoniumpivaldehyde dibromide melts at 67° C. and is soluble in water. Analysis of the monohydrate showed:

Calculated: C, 48.0; H, 7.4. Found: C, 48.3; H, 7.7.

EXAMPLE II

A mixture of α,α'-dibromo-p-xylene and an excess of 4-pyridinecarboxaldehyde was allowed to react in dry acetone. After 10 minutes the resulting yellow hygroscopic salt, p-xylylene-bis-4-formylpyridinium dibromide, was separated. The product melts at 90° C. and is soluble in water. Analysis of the monohydrate showed:

Calculated: C, 47.0; H, 7.4. Found: C, 47.2; H, 7.6.

EXAMPLE III

To a solution of 5 grams of 2,2'-dibromo-p-xylene in 75 cc. of dry acetone a large excess of dimethylaminoacetaldehydediacetal was added with stirring. The product was a white solid melting at 197° C. and of the formula:

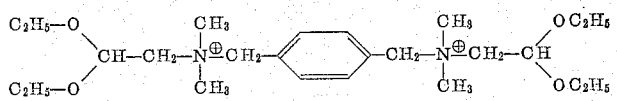

The following non-limiting examples illustrate the preparation of dyeable polymeric films within the scope of this invention.

EXAMPLE IV

A solution of 1 gram of p-xylylene-bis-3-dimethylammoniumpivaldehyde dibromide, 3 grams of polyvinyl alcohol and a catalytic amount of sulfuric acid was coated on baryta paper and heated 30 seconds at 110° C. The polymeric film and support was then dipped for 30 seconds in an aqueous solution of Neolan Pink BA (C.I. 18810) dye. The excess dye was then washed from the polymer with cold water. The film was insoluble and the dye was not extracted in boiling water.

EXAMPLE V

A polymeric film was prepared as in Example V using p-xylylene-bis-formylpyridinium dibromide. When tested by placing the film in boiling water the dye was not extracted and the film was insoluble.

EXAMPLE VI

A polymeric film was prepared as in Example V using the product of Example III. The film was insoluble and the dye was not extracted in boiling water.

The ratio of 1 gram of cross-linking mordant to 3 grams of polyvinyl alcohol in the above examples represents cross-linking through 8 to 10% of the hydroxyl groups of the polymer.

In casting the film a small amount of strong mineral acid is preferably added to the solution of polyvinyl alcohol and cross-linking mordant in order to catalyze the reaction. The presence of the acid is not essential to the cross-linking reaction; however, if the acid is not used the heating time must be extended.

The following example illustrates the modification of a polymer containing a mordant.

EXAMPLE VII

A solution of 1 gram of p-xylylene bis-3-dimethylammonium-pivaldehyde dibromide and 4 grams of a polymer comprising a partial acetal of polyvinyl alcohol and a trialkylammonium benzaldehyde quaternary salt, prepared according to the method disclosed in the aforementioned U.S. copending application, Serial No. 71,424, was prepared and coated on baryta paper and heated 30 seconds at 110° C. The polymeric sheet was then dipped for 30 seconds in an aqueous solution of Neolan Pink BA (C.I. 18810) dye. The excess dye was washed off with cold water and the resulting film was found to possess a greater degree of water insensitivity than the unmodified polymeric sheet of the above-identified copending application.

The present invention may be used wherever a dyeable polymeric stratum that is insoluble in water is desired. The dyeable polymeric strata of the present invention are also useful as image-receiving sheets for color photography.

It is apparent that the dyeable polymeric materials of this invention may be supported or unsupported, that is, a film may be cast on glass, for example, and then peeled off and used as above or it may be used bonded to supports such as glass or paper, for example, baryta paper, or plastics such as cellulose acetate butyrate and subcoated cellulose acetate. The dyeable polymeric materials of this invention may also be prepared as fibers.

In addition to the particular dye set forth in the above examples, it has been found that polymers cross-linked with the cross-linking mordants of this invention are dyeable by dyes which contain silver halide developing funcfunctions, e.g., a p-dihydroxyphenyl group. Examples of such dyes, frequently referred to as dye developers, are given in the above-mentioned application of Howard C. Haas, Serial No. 71,424, and in U.S. Patent No. 2,983,606, issued to Howard G. Rogers on May 9, 1961. Such dyes are usually applied from an aqueous alkaline solution. The resulting cross-linked polymeric materials may be used in diffusion transfer processes to receive color transfer images.

Since certain changes may be made in the above products and processes without departing from the scope of the invention herein involved, it is intended that all matter contained in the above description shall be interpreted as illustrative and not in a limiting sense.

What is claimed is:

1. A compound selected from the group consisting of compounds represented by the formula:

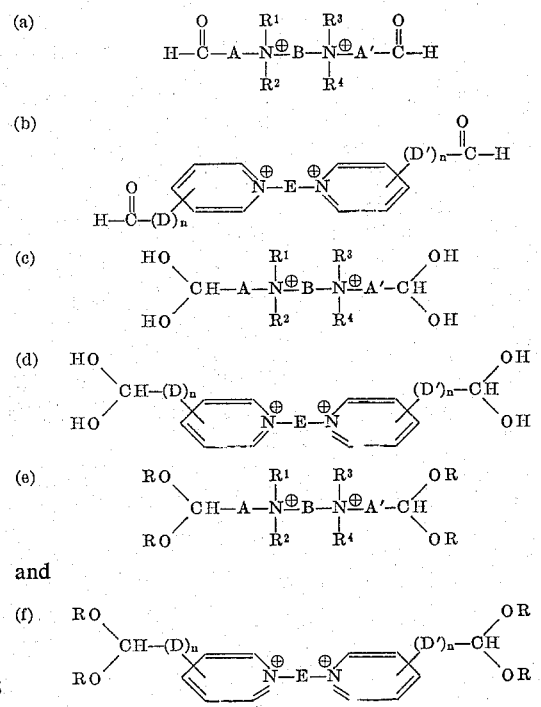

wherein each of R, $R^1$, $R^2$, $R^3$, and $R^4$ is a lower alkyl group; $n$ is an integer from 0 to 1, inclusive; and each of A, A′, B, D, D′, and E is a divalent radical selected from the group consisting of lower aliphatic hydrocarbon radicals, phenylene, and a single radical consisting of phenyl and at least one lower aliphatic hydrocarbon group.

2. p-Xylylene-bis-4-formylpyridinium dibromide.

3. p-Xylylene-bis-3-dimethylammonium pivaldehyde dibromide.

4. The compound of the formula:

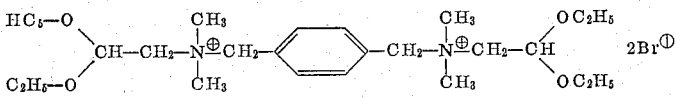

No references cited.

JOHN D. RANDOLPH, *Primary Examiner.*

WALTER A. MODANCE, ROBERT T. BOND,
*Examiners.*

UNITED STATES PATENT OFFICE
CERTIFICATE OF CORRECTION

Patent No. 3,309,376                            March 14, 1967

Howard C. Haas et al.

It is hereby certified that error appears in the above numbered patent requiring correction and that the said Letters Patent should read as corrected below.

Column 1, line 47, for "way" read -- may --; column 2, about line 65, for the portion of the formula reading

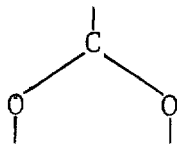     read     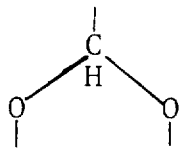

column 3, formula 2, for that portion of the formula reading

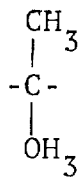     read     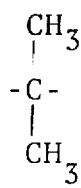

same column 3, formula 5, for that portion of the formula reading

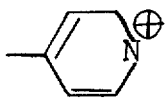     read     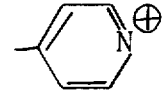

same formula 5, for "$2Br^{\ominus}$" read -- $2Cl^{\ominus}$ --; column 3, line 69, for "It should be" read -- It should also be --; column 4, lines 4 to 6, for that portion of the formula reading

     read     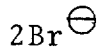

columns 5 and 6, lines 68 to 70, for the left-hand portion of the formula reading (2)

$HC_5$-O\          read          $C_2H_5$-O\ same formula, right-hand side, for that portion of the formula reading $2Br^{\oplus}$          read          $2Br^{\ominus}$ Signed and sealed this 24th day of June 1969.

(SEAL)
Attest:

EDWARD M. FLETCHER, JR.  
Attesting Officer

WILLIAM E. SCHUYLER, JR.  
Commissioner of Patents